(No Model.)

A. H. BLACKBURN.
FRUIT EVAPORATOR.

No. 535,662. Patented Mar. 12, 1895.

Witnesses.
F. Monteverde
M. R. Bryan

Inventor.
A. H. Blackburn
by Shear & Seely
Attorneys

UNITED STATES PATENT OFFICE.

ALLEN H. BLACKBURN, OF PETALUMA, CALIFORNIA.

FRUIT-EVAPORATOR.

SPECIFICATION forming part of Letters Patent No. 535,662, dated March 12, 1895.

Application filed August 9, 1894. Serial No. 519,885. (No model.)

*To all whom it may concern:*

Be it known that I, ALLEN H. BLACKBURN, a citizen of the United States, residing at Petaluma, in the county of Sonoma and State of California, have invented certain new and useful Improvements in Fruit-Evaporators; and I do hereby declare that the following is a full, clear, and exact description thereof.

My invention relates to apparatus for drying and evaporating fresh fruit and consists in certain novel features of construction, hereinafter pointed out and designed to make the application of the drying agents like hot air and steam more complete, thorough and effective.

In order to have a full comprehension of my invention reference must be made to the following detailed description in connection with the accompanying drawings, in which—

Figure 1:
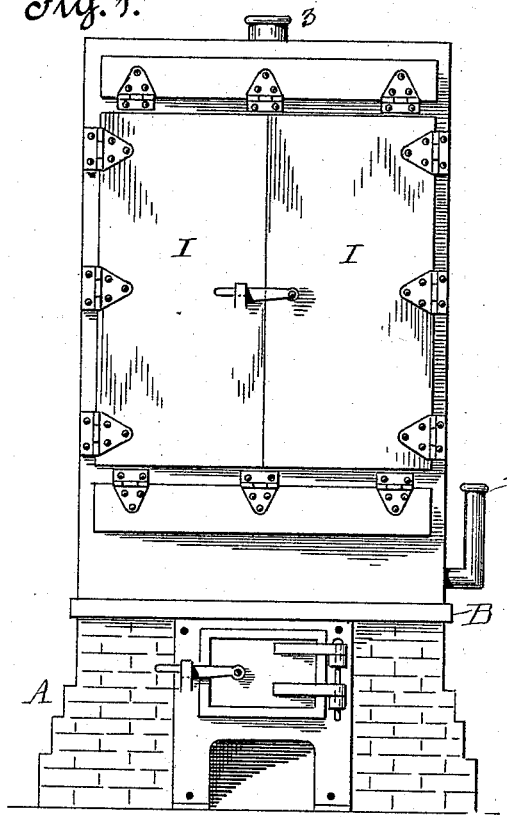
Figure 2:
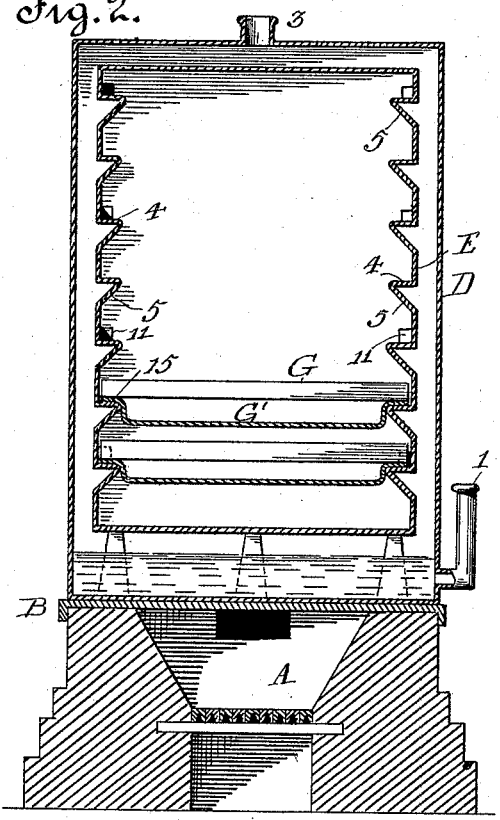
Figure 3:
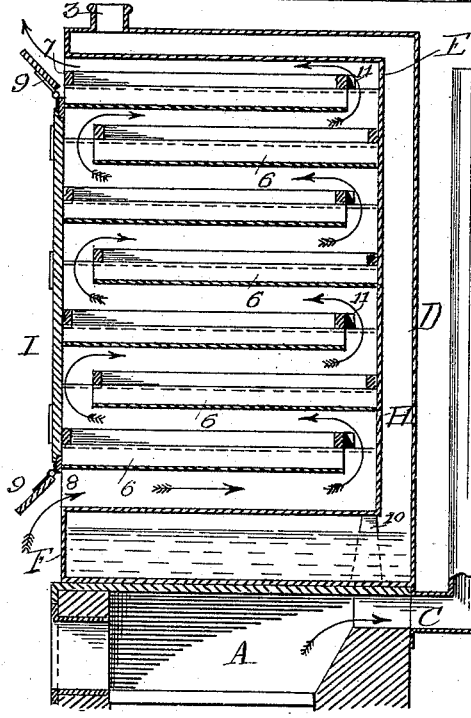

Figure 1, is a front elevation of the apparatus complete. Fig. 2, is a vertical section looking toward the front. Fig. 3, is a vertical section at right angles to Fig. 2.

A, represents the furnace, which may be of any suitable construction, and which in itself forms no part of my invention. It is shown as provided with a top plate B, which supports the fruit drier proper, and beneath which the products of combustion circulate in the combustion chamber before they escape through the flue C, and stack. The fruit drying chamber is composed of an outer jacket D, and an inner structure E, which contains the fruit trays. The jacket surrounds the drying chamber upon all sides except the front, thus leaving a clear open space at top, bottom, ends, and rear, as clearly shown in the sectional views. At the front the inner chamber is secured by soldering or otherwise to the front wall F. The bottom of the inclosing jacket thus formed is supplied with water by a filling tube 1, which may also act as a gage to determine the condition of the water supply. The body of water as shown in Figs. 2 and 3, is directly above the combustion chamber of the furnace, where it is exposed to the full heat from the latter; so that the steam generated rises and circulates throughout the space surrounding the drying chamber, until it escapes through a vent 3, at the top. The contents of the drying chamber are thus surrounded by hot water and steam in the jacket while at the same time the air in the interior is thoroughly heated for direct action upon the contents. In order to make this application of hot air as effective as possible, I have devised an improved way of placing and supporting the fruit trays so that the fruit shall be exposed as thoroughly as possible, and at both top and bottom simultaneously to the hot air. For this purpose, the sides of the inner chamber are formed by rolling or otherwise, into a series of angular projections having flat upper faces 4, to support the trays, but inclined below as at 5, to deflect the hot air inward and against the trays, as the air rises at the sides. The number of these supports depends of course upon the capacity of the drier. Ordinarily about twenty would be used, although as a matter of convenience I have shown a smaller number in the drawings.

The fruit trays G, are rectangular frames adapted to the width of the drier. Beneath each of them is a metallic flue G', formed as shown in Fig. 2, with flanges 15, which rest upon the projections of the inner chamber. The flues themselves however depend below the supports, and thus admit the hot air below each tray. The arrangement of trays is best shown in Fig. 3. The trays are alternately set against the rear wall H, and the main doors I, so as to provide the circulating passage between the trays, through which the hot air is forced to pass. At the same time the air is free to enter into the spaces 6, directly below the fruit. Thus the fruit is exposed at both top and bottom to the air circulating in the vessel.

The doors I, are hinged to the front wall and are adapted to close tightly and be secured so, as to make a solid front wall when the drier is in operation. Above and below these doors are the air exit 7, and the air inlet 8, either or both of which are adapted to be closed by flaps 9, which are set upon horizontal hinges.

It should be noticed, that as the inner chamber is secured to the outer only at the front, it is advisable to provide supports such as 10, for supporting the rear end, but which do not interfere at all with the free passage of hot air or steam.

Ordinarily it will only be necessary to place those trays which extend to the front flush with the front wall before closing the door; but to prevent carelessness in so placing them and to insure their proper position, I provide stops 11, Figs. 2 and 3, which limit the movement of the alternate trays as they are pushed in, before they reach the rear wall, thus insuring the maintenance of the open spaces behind them. These stops can be secured to the end walls, or the rear walls or to the ledges upon which the trays are supported, as may be preferred.

Having described my invention, what I claim is—

In combination with the drying chamber having ledges upon its side walls, a series of fruit trays, supported by said ledges and arranged so as to form a tortuous hot-air passage in the chamber, and depending plates supported by said ledges below the respective trays; each plate forming in connection with a tray, a flue or passage beneath said tray, substantially as described.

In testimony whereof I have affixed my signature, in presence of two witnesses, this 26th day of July, 1894.

ALLEN H. BLACKBURN.

Witnesses:
 JOHN COFFEE,
 F. H. LEVY.